United States Patent
Akiba

(10) Patent No.: US 11,837,183 B2
(45) Date of Patent: Dec. 5, 2023

(54) CIRCUIT DEVICE AND HEAD-UP DISPLAY DEVICE

(71) Applicant: SEIKO EPSON CORPORATION, Tokyo (JP)

(72) Inventor: Yasutoshi Akiba, Chino (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/963,224

(22) Filed: Oct. 11, 2022

(65) Prior Publication Data

US 2023/0111544 A1  Apr. 13, 2023

(30) Foreign Application Priority Data

Oct. 12, 2021  (JP) ................... 2021-167090

(51) Int. Cl.
| | |
|---|---|
| *G02B 27/01* | (2006.01) |
| *B60K 35/00* | (2006.01) |
| *G09G 3/34* | (2006.01) |
| *G06T 7/90* | (2017.01) |
| *G06T 5/00* | (2006.01) |
| *G09G 3/36* | (2006.01) |

(52) U.S. Cl.
CPC ....... *G09G 3/3426* (2013.01); *G02B 27/0101* (2013.01); *G06T 5/006* (2013.01); *G06T 7/90* (2017.01); *G09G 3/36* (2013.01); *G02B 2027/011* (2013.01); *G02B 2027/014* (2013.01); *G09G 2320/0646* (2013.01)

(58) Field of Classification Search
CPC ................................ G02B 27/01; B60K 35/00
See application file for complete search history.

(56) References Cited

U.S. PATENT DOCUMENTS

| | | | | |
|---|---|---|---|---|
| 2017/0334455 | A1* | 11/2017 | Asakura | B60W 10/10 |
| 2019/0243133 | A1* | 8/2019 | Liao | B60K 35/00 |
| 2019/0266711 | A1 | 8/2019 | Anand et al. | |
| 2019/0369396 | A1* | 12/2019 | Smith | B60K 35/00 |
| 2020/0198468 | A1 | 6/2020 | Anand et al. | |

(Continued)

FOREIGN PATENT DOCUMENTS

| | | |
|---|---|---|
| JP | 2001-117071 A | 4/2001 |
| JP | 2018-090170 A | 6/2018 |
| JP | 2019-149760 A | 9/2019 |

(Continued)

*Primary Examiner* — Nan-Ying Yang
(74) *Attorney, Agent, or Firm* — Harness, Dickey & Pierce, P.L.C.

(57) ABSTRACT

A circuit device is used in a head-up display device including a display panel and a backlight device having a plurality of light emitting elements. The circuit device includes a distortion correction circuit and an image analysis circuit. The distortion correction circuit performs distortion correction on input image data and outputs output image data after the distortion correction. The image analysis circuit analyzes image data to be analyzed, which is the input image data or the output image data, and, based on an analysis result, and performs backlight control processing of turning off a light emitting element corresponding to a display area that becomes transparent when projected by the head-up display device among a plurality of display areas corresponding to the plurality of light emitting elements in the display panel.

7 Claims, 15 Drawing Sheets

(56) References Cited

U.S. PATENT DOCUMENTS

2020/0201035 A1 6/2020 Anand et al.
2021/0193066 A1 6/2021 Anand et al.

FOREIGN PATENT DOCUMENTS

| JP | 2020-050328 | A | 4/2020 |
| JP | 2020-100388 | A | 7/2020 |
| JP | 2020-101784 | A | 7/2020 |
| JP | 2021-101199 | A | 7/2021 |
| WO | 2020/025648 | A1 | 2/2020 |

* cited by examiner

FIG. 4
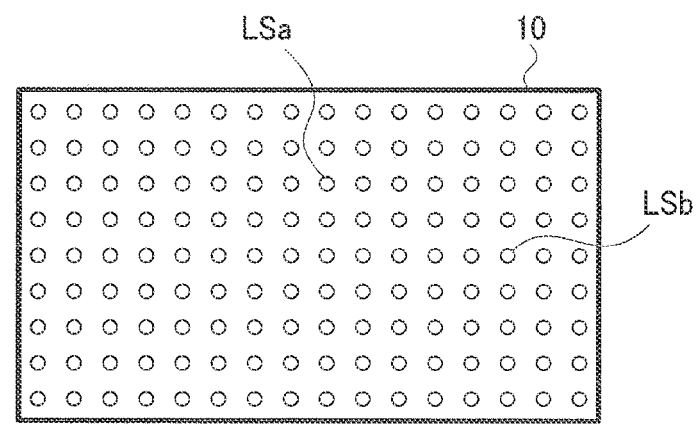
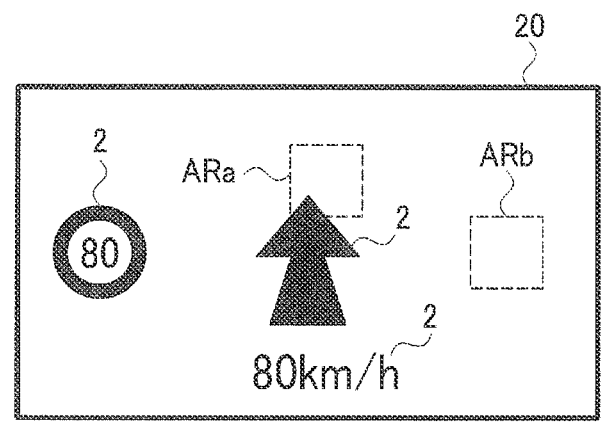

FIG. 5
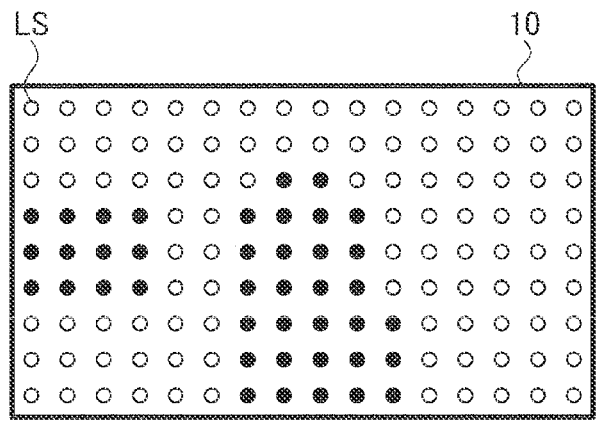
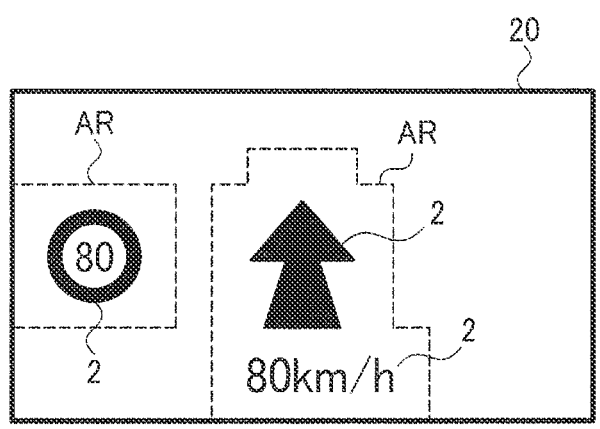
HUD DISPLAY
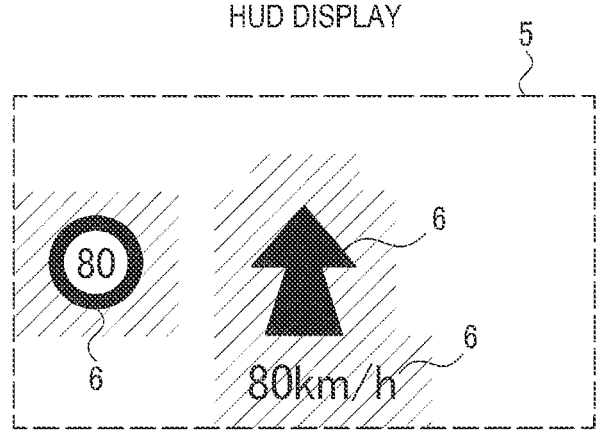

CIRCUIT DEVICE AND HEAD-UP DISPLAY DEVICE

The present application is based on, and claims priority from JP Application Serial Number 2021-167090, filed Oct. 12, 2021, the disclosure of which is hereby incorporated by reference herein in its entirety.

BACKGROUND

1. Technical Field

The present disclosure relates to a circuit device and a head-up display device.

2. Related Art

A head-up display device that projects an image on a transparent screen and allows a user viewing the screen to visually recognize a virtual image is known. JP-A-2001-117071 discloses a vehicle display device including a liquid crystal display, a backlight light source provided at a back surface of the liquid crystal display, and a reflection plate that reflects light transmitted through the liquid crystal display toward a windshield.

From the user who views the head-up display device, the virtual image projected by the head-up display device appears to overlap with a real world seen through the screen. In a display area of the head-up display device, an area without display objects appears to be transparent to the user, that is, the real world is seen as it is. However, due to a nature of the head-up display device that projects light onto the screen, some light may also be projected onto the transparent area without display objects, and an area that should be originally transparent may appear whitish.

SUMMARY

An aspect of the present disclosure relates to a circuit device used in a head-up display device including a display panel and a backlight device having a plurality of light emitting elements. The circuit device includes: a distortion correction circuit configured to perform distortion correction on input image data and output output image data after the distortion correction; and an image analysis circuit configured to analyze image data to be analyzed, which is the input image data or the output image data, and, based on an analysis result, perform backlight control processing of turning off a light emitting element corresponding to a display area that becomes transparent when projected by the head-up display device among a plurality of display areas corresponding to the plurality of light emitting elements in the display panel.

Another aspect of the present disclosure relates to a head-up display device including the circuit device, the display panel, and the backlight device as described above.

BRIEF DESCRIPTION OF THE DRAWINGS

FIG. 4 shows an example of display areas corresponding to light emitting elements.

FIG. 5 shows a display example according to the present embodiment.

DESCRIPTION OF EXEMPLARY EMBODIMENTS

Hereinafter, preferred embodiments of the present disclosure will be described in detail. The present embodiments to be described below do not unduly limit contents described in the claims, and not all configurations described in the present embodiments are necessarily essential constituent elements.

1. HUD Display

Figure 1:
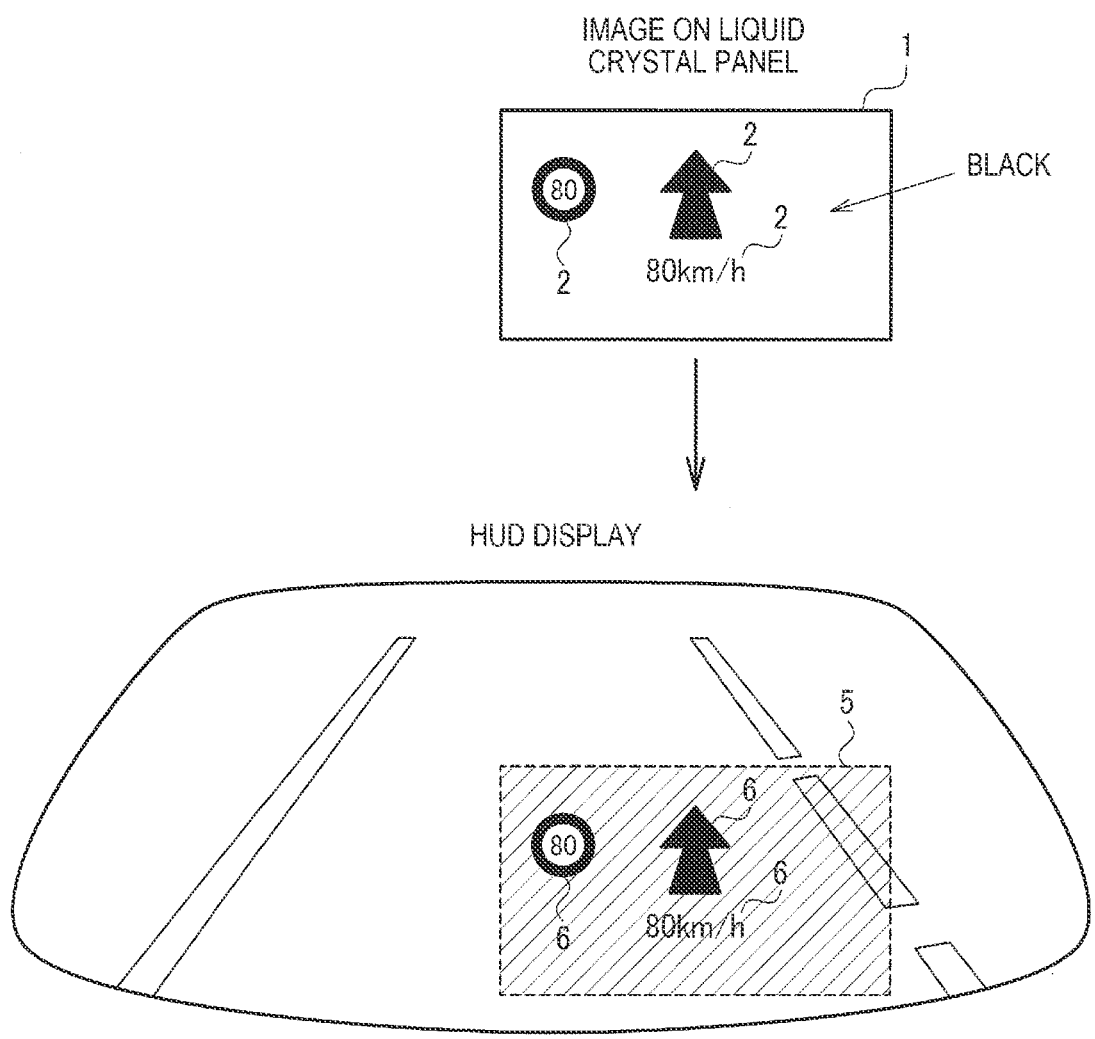
FIG. 1 is an example of a HUD display in a head-up display device in the related art.

FIG. 1 is an example of a HUD display in a head-up display device in the related art. Although image distortion during projection is ignored here, a HUD display to be described below has the same problem even when the image distortion is present. HUD is an abbreviation for head-up display, and hereinafter, a head-up display device may be appropriately abbreviated as HUD.

An upper part of FIG. 1 shows an example of an image displayed on a liquid crystal panel of a HUD. An image 1 includes several display objects 2. In the liquid crystal panel, pixels in an area in which the display objects 2 are displayed transmit light according to a gradation value, and pixels in an area without the display objects 2 do not transmit light.

A lower part of FIG. 1 is a display example when the head-up display device projects the image in the upper part onto a field of view of a user. A backlight device emits light, the light transmitted through the liquid crystal panel is reflected by a reflection plate toward a screen, and the light reflected by the screen is incident on eyes of the user, so that display objects 6 of a virtual image corresponding to the display objects 2 are projected onto the field of view of the user. The display objects 6 of the virtual image overlap with a real world, which is a background of the HUD display.

At this time, since an area in which the display objects 6 of the virtual image are not displayed in a display area 5 of the HUD is in a non-transmissive state in the liquid crystal panel, the area has a transparent color with nothing displayed originally, and the background should be visible as it is. However, since the light of the backlight device is only slightly transmitted even in a non-transmissive area of the liquid crystal panel, the area originally having a transparent color appears slightly brighter than surroundings thereof in the HUD display. For example, in a dark environment such as at night or in a tunnel, the area in which the display objects 6 of the virtual image are not displayed in the display area 5 appears whitish, and thus visibility of the background which overlaps with the area may decrease.

2. First Configuration Example

Figure 2:
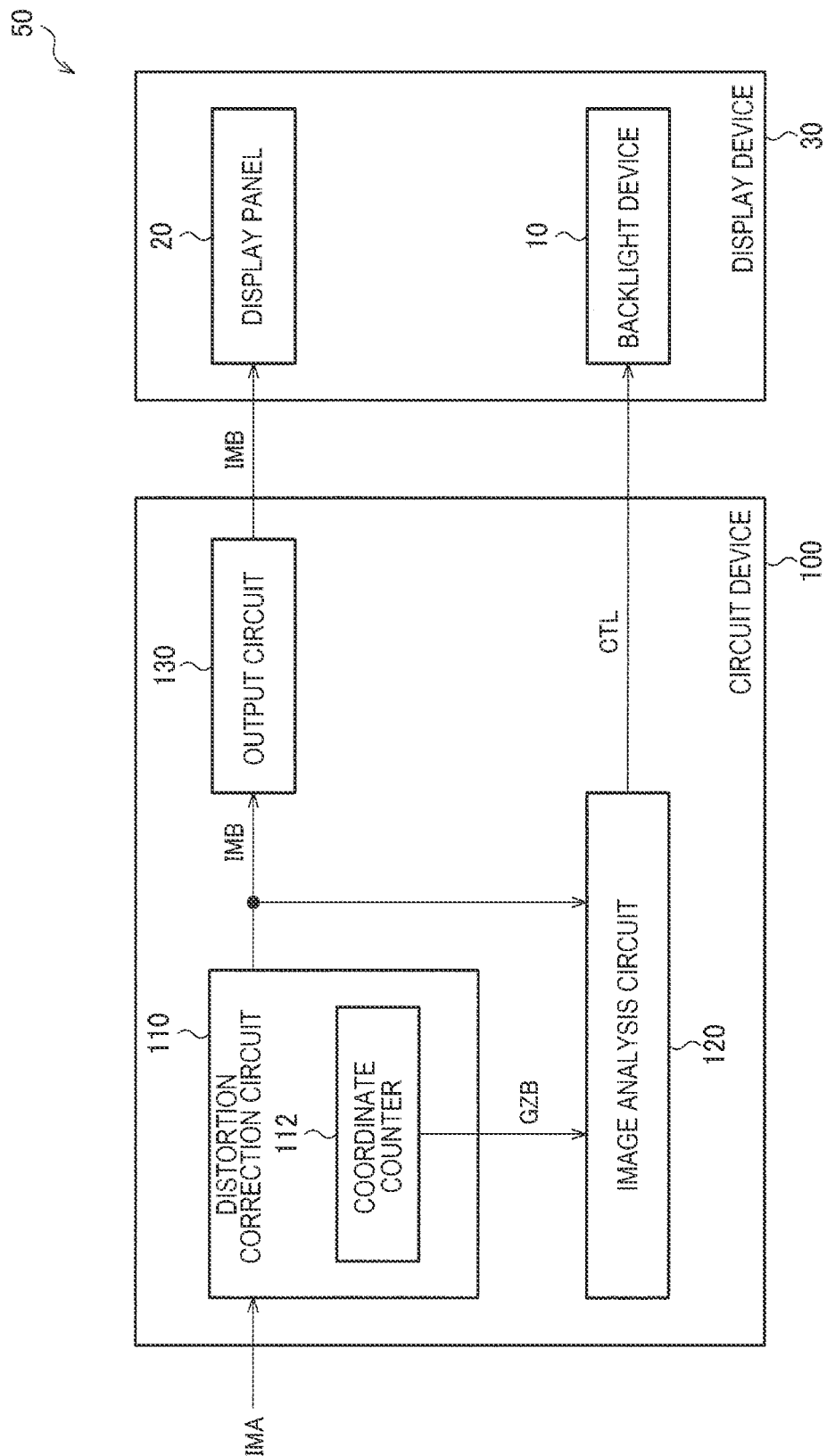
FIG. 2 is a first configuration example of a circuit device and a head-up display device.

FIG. 2 is a first configuration example of a circuit device 100 and a head-up display device 50 according to the present embodiment. The head-up display device 50 includes a display device 30 and the circuit device 100. Although the head-up display device 50 includes an optical system such as a reflection plate, illustration thereof is omitted in FIG. 2.

Figure 3:
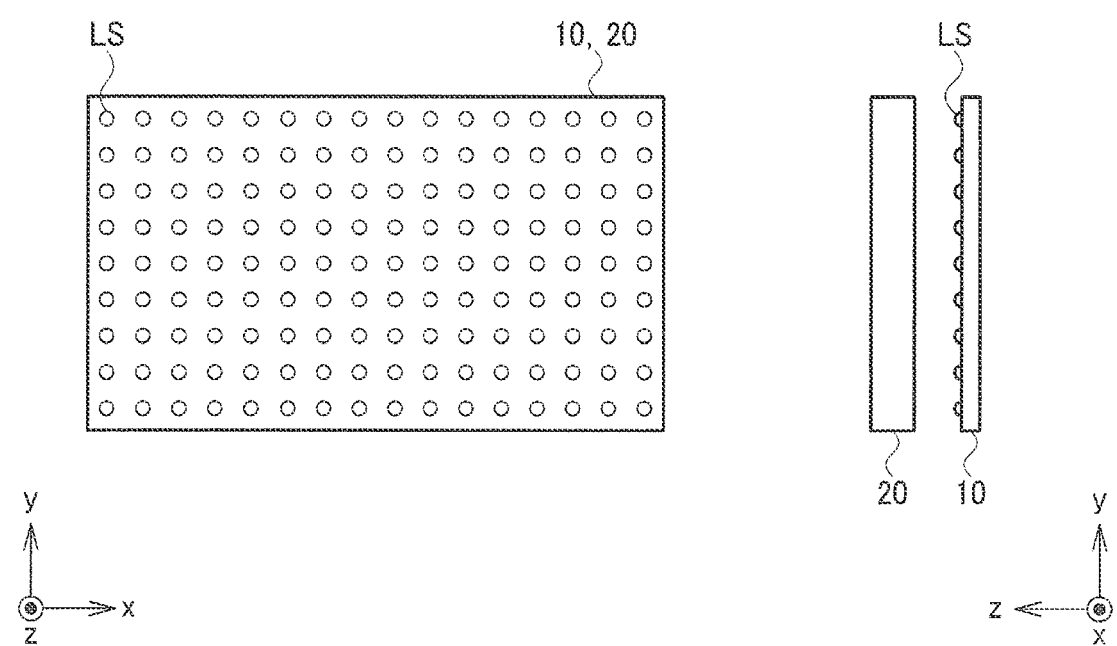
FIG. 3 is a planar view and a side view of a backlight device and a display panel.

The display device 30 includes a backlight device 10 and a display panel 20. FIG. 3 is a planar view and a side view of the backlight device 10 and the display panel 20.

The display panel 20 is a liquid crystal display panel in which pixels are arranged in an array. Hereinafter, a case in which the display panel 20 is a transmissive liquid crystal panel will be described as an example, but the display panel 20 may also be a reflective liquid crystal panel. In FIG. 3, a direction parallel to a horizontal scanning direction of the display panel 20 is defined as an x direction, and a direction parallel to a vertical scanning direction is defined as a y direction. A direction orthogonal to the x direction and the y direction and directed from the backlight device 10 to the display panel 20 is defined as a z direction.

The backlight device 10 includes a plurality of light emitting elements LS disposed on a plane parallel to an xy plane. The plurality of light emitting elements LS are disposed in substantially the same area as a pixel array in the display panel 20 in a plan view. When all of the plurality of light emitting elements LS are turned on, the plurality of light emitting elements LS are arranged in an array shape such that an entire surface of the pixel array in the display panel 20 is irradiated with light. FIG. 3 shows an example in which the plurality of light emitting elements LS are arranged in 9 rows and 16 columns. The light emitting elements LS in each row are arranged in parallel to the x direction, and the light emitting elements LS in each column are arranged in parallel to the y direction. However, FIG. 3 is an example of arrangement of the light emitting elements, and the arrangement of the light emitting elements is not limited thereto.

Each of the light emitting elements LS of the backlight device 10 is a light emitting element that can be independently controlled to be turned on or turned off, such as an LED. LED is an abbreviation for light emitting diode. In the following description, turning on a light emitting element is also referred to as turn-on, and turning off a light emitting element is also referred to as turn-off. Each light emitting element LS may be configured to be dimmable independently, and may be controlled to be turned on or turned off independently using a dimming function thereof.

The circuit device 100 shown in FIG. 2 includes a distortion correction circuit 110, an image analysis circuit 120, and an output circuit 130. The circuit device 100 is, for example, an integrated circuit device in which a plurality of circuit elements are integrated on a semiconductor substrate.

The distortion correction circuit 110 performs distortion correction on input image data IMA by using coordinate conversion between pixel coordinates in the input image data IMA and pixel coordinates in output image data IMB, and outputs the output image data IMB as image data after correction. The distortion correction is image correction for the HUD display with no or reduced distortion by performing, on an image, image distortion reverse to image distortion when the image displayed on the display panel 20 is projected. The image distortion due to projection includes image distortion due to a curved surface of a screen, image distortion due to a HUD optical system, or both of the image distortions.

The distortion correction circuit 110 includes a coordinate counter 112 that counts pixel coordinates GZB in the output image data IMB. To "count pixel coordinates" means, for example, sequentially outputting coordinates indicating positions of pixels, such as (0, 0), (1, 0), . . . , (1919, 0), (0, 1), (1, 1), . . . , (1919, 1), . . . , (0, 1079), (1, 1079), . . . , and (1919, 1079) when an image size is 1920×1080 pixels.

The distortion correction circuit 110 corresponds to a reverse warp engine, and the coordinate counter 112 is used for reverse warp. The reverse warp means warp processing in which the pixel coordinates on the output image data IMB are subjected to coordinate conversion into reference coordinates corresponding to the pixel coordinates, and pixel data of the output image data IMB is obtained from pixel data of the input image data IMA at the reference coordinates. The coordinate conversion is defined by warp parameters. The warp parameters is a table in which the pixel coordinates and the reference coordinates are associated with each other, a table indicating movement amounts between the pixel coordinates and the reference coordinates, or coefficients of polynomials in which the pixel coordinates and the reference coordinates are associated with each other, or the like.

The output circuit 130 transmits the output image data IMB to the display device 30. The output circuit 130 may be a transmission circuit of various communication interfaces, and is, as an example, a transmission circuit of LVDS, DVI, a display port, GMSL, GVIF, or the like. LVDS is an abbreviation for low voltage differential signaling, DVI is an abbreviation for digital visual interface, GMSL is an abbreviation for gigabit multimedia serial link, and GVIF is an abbreviation for gigabit video interface.

Although not shown, a display controller and a display driver are provided between the output circuit 130 and the display panel 20. The display controller and the display driver are formed of one or a plurality of integrated circuit devices different from the integrated circuit device forming the distortion correction circuit 110. Alternatively, the integrated circuit device forming the distortion correction circuit 110 may incorporate a function of the display controller, or may incorporate functions of the display controller and the display driver.

The image analysis circuit 120 performs image analysis in parallel with the distortion correction to output a control signal CTL for independently controlling the light emitting elements LS of the backlight device 10 to be turned on or turned off. Specifically, the image analysis circuit 120 outputs the control signal CTL based on the pixel coordinates GZB output by the coordinate counter 112 and pixel data of the pixel coordinates GZB in the output image data IMB output by the distortion correction circuit 110. Hereinafter, a description will be made with reference to FIGS. 4 and 5.

FIG. 4 shows an example of display areas corresponding to the light emitting elements LS. FIG. 4 shows a display area ARa on the display panel 20 corresponding to a light emitting element LSa and a display area ARb on the display panel 20 corresponding to a light emitting element LSb. Although only the display areas corresponding to the two light emitting elements are shown here, there are display areas corresponding to light emitting elements, respectively.

Each of the display areas corresponding to a light emitting element is an area, on the display panel 20, irradiated with light emitted from the light emitting element. That is, an image displayed in the display area is projected by the light emitted from the light emitting element corresponding to the display area. A part of a display area corresponding to one light emitting element and a part of a display area corresponding to another light emitting element adjacent to the one light emitting element may overlap with each other. When the display area corresponding to the light emitting element is, for example, a rectangular area, the display area can be designated based on information that designates a start point coordinate, a width, and a height. Information indicating the display area corresponding to the light emitting element is written, for example, from a processing device outside the circuit device 100 to a register (not shown) or the like in the circuit device 100, or is stored in advance in a nonvolatile memory (not shown) provided in the circuit device 100.

The image analysis circuit 120 determines a display area to which the pixel coordinates GZB output by the coordinate counter 112 belong, and determines whether the light emitting element corresponding to the display area is to be turned off based on whether the pixel data of the pixel coordinates GZB is transparent in the HUD display. A transparent color is a color in which, when a color displayed on the display panel 20 is projected by the HUD, nothing is displayed on the HUD display and the background is seen as it is. Specifically, since the HUD display should become transparent when the pixels of the display panel 20 block light, the color that becomes black when displayed on the display panel 20 corresponds to the transparent color. Hereinafter, it is assumed that the black color in the image data becomes the transparent color in the HUD display.

When all the pixel data in the display area are black, the image analysis circuit 120 turns off the light emitting element corresponding to the display area, and when there is at least one piece of pixel data that is not black in the display area, the image analysis circuit 120 turns on the light emitting element corresponding to the display area. In the example of FIG. 4, the light emitting element LSa corresponding to the display area ARa overlapping with the display objects 2 is determined to be turned on, and the light emitting element LSb corresponding to the display area ARb not overlapping with the display objects 2 is determined to be turned off. When the number of pieces of pixel data that is not transparent in the display area is equal to or less than a predetermined number, the image analysis circuit 120 may turn off the light emitting element corresponding to the display area. The predetermined number is, for example, about 1 to several tens.

FIG. 5 shows an example of the HUD display according to the present embodiment. An upper diagram shows the light emitting elements in states of being turned on and turned off. White circles indicate light emitting elements in the state of being turned off, and black circles indicate light emitting elements in the state of being turned on. A middle diagram shows display areas AR projected by the light emitting elements in the state of being turned on in the upper diagram. The display areas AR include only the display objects 2 and the surroundings thereof, and an area without the display objects 2 is basically not included in the display areas AR. A lower diagram shows the HUD display when an image of the middle diagram is projected by the light emitting elements in the state of being turned on in the upper diagram. Since the light emitting elements corresponding to an area including the display objects 6 are turned on and the light emitting elements corresponding to an area excluding the display objects 6 are turned off, the display objects 6 are displayed, and the area without the display objects 6 basically has a transparent color rather than being whitish, so that the background can be seen as it is.

The distortion correction circuit 110 and the image analysis circuit 120 are logic circuits. The distortion correction circuit 110 and the image analysis circuit 120 may be configured as individual circuits, or may be configured as a circuit in which the distortion correction circuit 110 and the image analysis circuit 120 are integrated by automatic placement and routing or the like. Some or all of these logic circuits may be implemented by a processor such as a digital signal processor (DSP). In this case, a program or an instruction set in which functions of circuits are described is stored in a memory, and the functions of the circuits are implemented by the processor executing the program or the instruction set.

Figure 6:
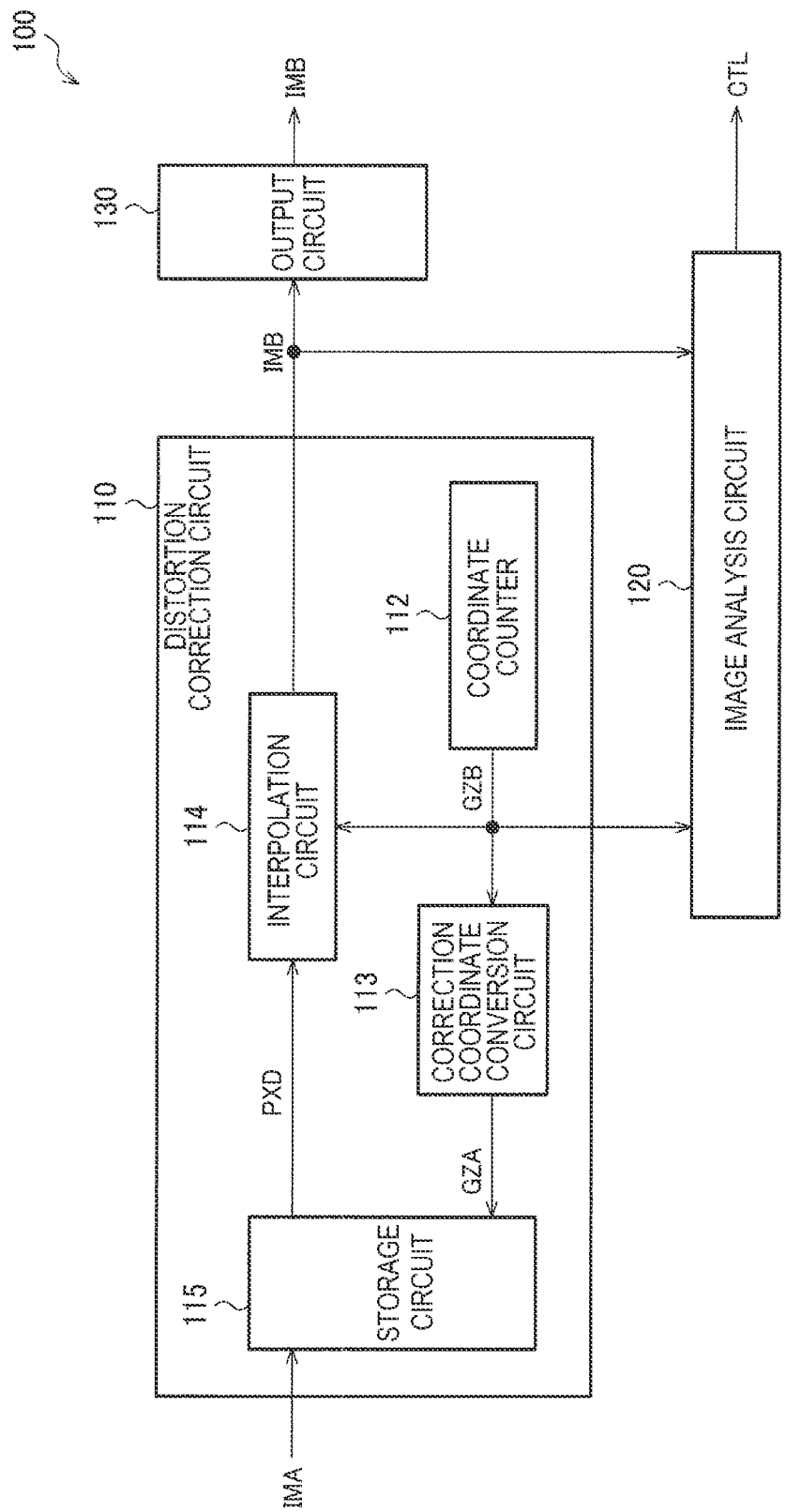
FIG. 6 is a first detailed configuration example of the circuit device.
Figure 7:
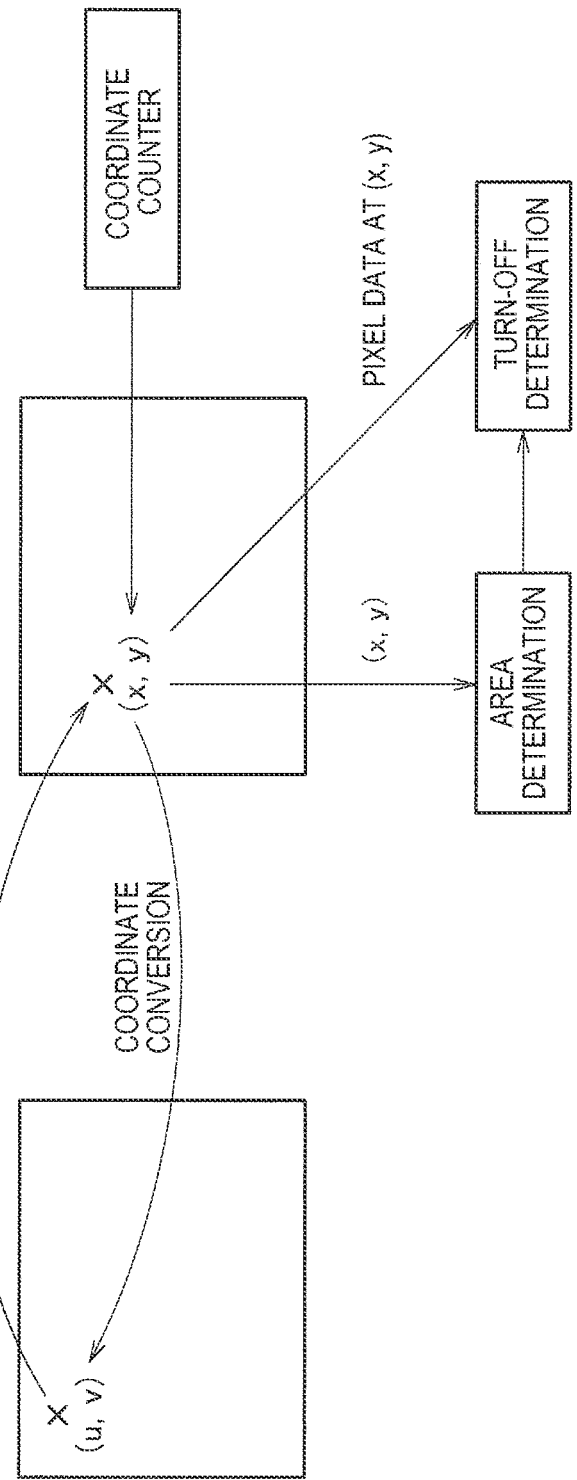
FIG. 7 is a diagram showing operations of the circuit device in the first detailed configuration example.

FIG. 6 is a first detailed configuration example of the circuit device 100. The distortion correction circuit 110 includes the coordinate counter 112, a correction coordinate conversion circuit 113, an interpolation circuit 114, and a storage circuit 115. FIG. 7 is a diagram showing operations of the circuit device 100 in the first detailed configuration example.

The coordinate counter 112 outputs the pixel coordinates GZB=(x, y) on the output image data IMB. The correction coordinate conversion circuit 113 converts the pixel coordinates (x, y) into reference coordinates GZA=(u, v) which are coordinates on the input image data IMA. The storage circuit 115 temporarily stores the input image data IMA and outputs pixel data PXD of the reference coordinates (u, v). Specifically, the correction coordinate conversion circuit 113 converts the reference coordinates (u, v) into a read address, and the storage circuit 115 reads the pixel data PXD of the reference coordinates (u, v) from the read address. More specifically, the correction coordinate conversion circuit 113 outputs read addresses of a plurality of pixels around the reference coordinates (u, v), and the storage circuit 115 reads pixel data of the plurality of pixels. The interpolation circuit 114 obtains pixel data of the pixel coordinates (x, y) in the output image data IMB by performing interpolation processing on a plurality of pieces of pixel data that are read corresponding to the reference coordinates (u, v).

The image analysis circuit 120 determines that the pixel coordinates (x, y) output by the coordinate counter 112 belong to which display area, that is a display area corresponding to which light emitting element. The image analysis circuit 120 determines whether to turn off each light emitting element by using a determination result and the pixel data of the pixel coordinates (x, y) output by the interpolation circuit 114.

In the present embodiment described above, the circuit device 100 is used in the head-up display device 50. The head-up display device 50 includes the display panel 20 and the backlight device 10 having the plurality of light emitting elements LS. The circuit device 100 includes the distortion correction circuit 110 and the image analysis circuit 120. The distortion correction circuit 110 performs distortion correction on the input image data IMA and outputs the output image data IMB after the distortion correction. The image analysis circuit 120 analyzes the image data to be analyzed, which is the input image data IMA or the output image data IMB, and, based on an analysis result, performs backlight control processing of turning off the light emitting elements LS corresponding to the display areas AR that become transparent when projected by the head-up display device 50 among a plurality of display areas AR corresponding to the plurality of light emitting elements LS in the display panel 20.

In the first configuration example, an example in which the image analysis circuit 120 analyzes the output image data IMB as the image data to be analyzed is described, but the image analysis circuit 120 may analyze the input image data IMA as the image data to be analyzed. An example thereof will be described below in a second configuration example.

According to the present embodiment, the display area that becomes transparent when projected by the HUD is determined by the image analysis. Among the plurality of light emitting elements LS disposed in the backlight device 10, the light emitting element LS corresponding to the display area that becomes transparent when projected by the HUD is turned off, so that the display area becomes an area that is originally transparent rather than being displayed whitish in the HUD display. Accordingly, even when the background is dark at night or in a tunnel or the like, the area without display objects in the HUD display becomes the area that is originally transparent, and the visibility of the background does not decrease.

Further, in the present embodiment, the image analysis circuit 120 analyzes whether the image data to be analyzed in each display area AR of the plurality of display areas is transparent color data, and performs the backlight control processing of turning off the light emitting element LS corresponding to the display area AR in which the image data to be analyzed is analyzed as transparent color data.

According to the present embodiment, the image analysis circuit 120 performs the image analysis of analyzing whether the image data to be analyzed in each display area AR is the transparent color data, and thus it is possible to determine the display area AR that becomes transparent when projected by the head-up display device 50 among the plurality of display areas AR.

In the present embodiment, the distortion correction circuit 110 includes the coordinate counter 112 that counts the pixel coordinates GZB of the image data to be analyzed. The image analysis circuit 120 determines the display area AR to which each pixel of the image data to be analyzed belongs among the plurality of display areas AR based on the pixel coordinates GZB output by the coordinate counter 112, and determines the display area AR that becomes transparent based on a determination result.

According to the present embodiment, since the pixel coordinates GZB output by the coordinate counter 112 indicate the pixel coordinates of each pixel in the image data to be analyzed, the image analysis circuit 120 can determine the display area AR to which each pixel of the image data to be analyzed belongs among the plurality of display areas AR based on the pixel coordinates GZB.

In addition, in the present embodiment, the image analysis circuit 120 determines whether the pixel data belonging to each display area AR of the plurality of display areas is transparent color data based on the pixel coordinates GZB output by the coordinate counter 112 and the pixel data of the image data to be analyzed at the pixel coordinates GZB, thereby determining whether each display area AR is a display area AR that becomes transparent.

According to the present embodiment, the image analysis circuit 120 can determine the display area AR to which the pixel coordinates GZB belong and whether the pixel data of the pixel coordinates GZB are transparent color data.

Accordingly, the image analysis circuit 120 can determine whether each display area AR is a display area that becomes transparent on the HUD display.

According to the present embodiment, the image data to be analyzed is the input image data IMA input to the distortion correction circuit 110 or the output image data IMB output by the distortion correction circuit 110, and the pixel coordinates output by the coordinate counter 112 included in the distortion correction circuit 110 are used for the image analysis. Accordingly, the distortion correction circuit 110 performs the distortion correction, and the image analysis circuit 120 can perform backlight control based on the image analysis in parallel with the distortion correction, and thus it is possible to eliminate or simplify a time lag adjustment between the HUD display and the backlight control. Hereinafter, a description will be made with reference to FIGS. 8 and 9.

Figure 8:
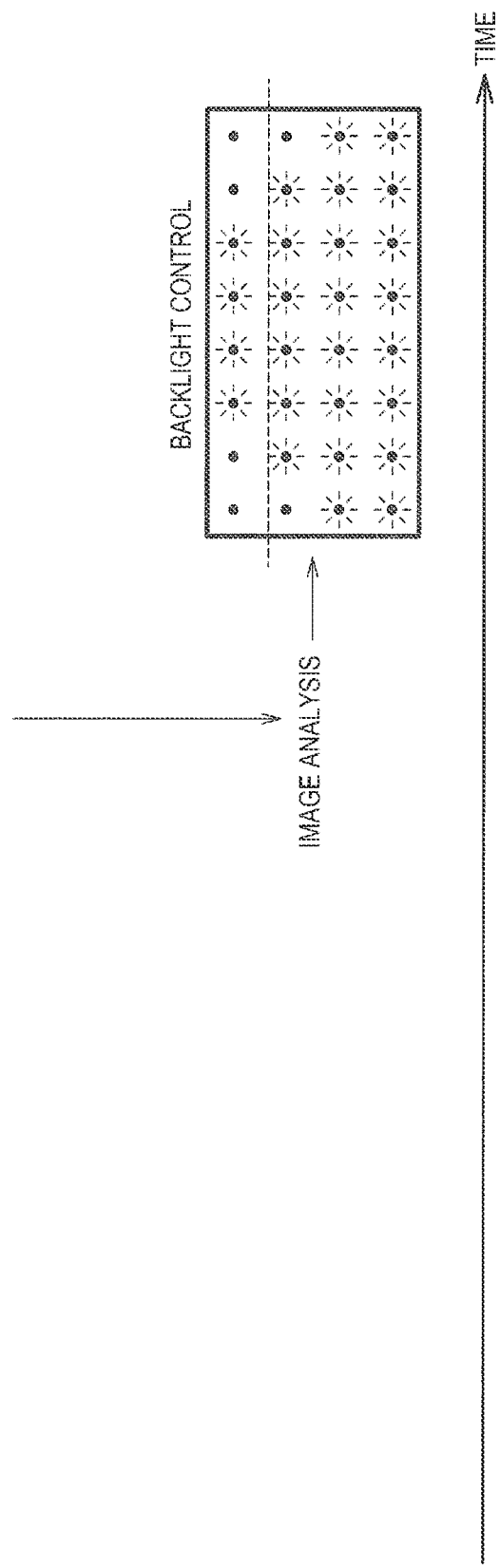
FIG. 8 is a timing chart when backlight control is performed at a rear stage of the circuit device without using the present embodiment.

FIG. 8 shows a timing chart when the backlight control is performed at a rear stage of the circuit device 100 without using the present embodiment. FIG. 8 schematically shows timing of the backlight control, and does not necessarily show exact timing. As shown in FIG. 8, in a path for displaying an image on the display panel 20, the distortion correction circuit 110 sequentially outputs the output image data IMB for each line, and the output image data IMB for each line is sequentially displayed on the display panel 20. On the other hand, in the path of the backlight control, for example, a frame memory is provided at the rear stage of the circuit device 100 to buffer the output image data IMB of one frame, and analyzes the output image data IMB to perform the backlight control. Therefore, timing of image display and the timing of the backlight control are shifted by, for example, one frame or more.

Figure 9:
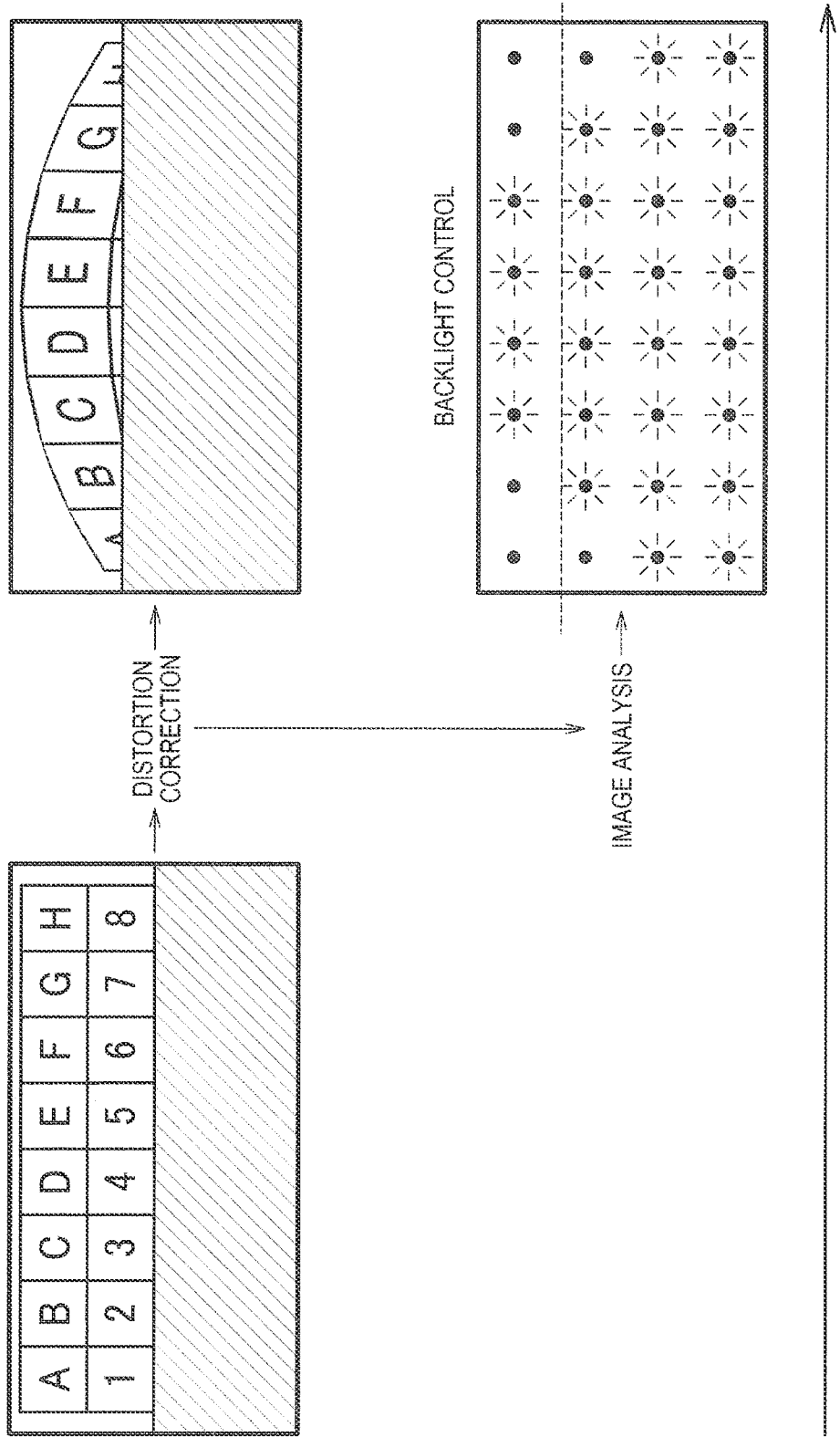
FIG. 9 is a timing chart when the backlight control is performed at the rear stage of the circuit device while the present embodiment is used.

FIG. 9 shows a timing chart when the backlight control is performed at the rear stage of the circuit device 100 while the present embodiment is used. FIG. 9 schematically shows the timing of the backlight control, and does not necessarily show exact timing. As shown in FIG. 9, in a path for displaying an image on the display panel 20, the distortion correction circuit 110 sequentially outputs the output image data IMB for each line, and the output image data IMB for each line is sequentially displayed on the display panel 20. This is the same as in FIG. 8. In a path of the backlight control, the image analysis is performed in parallel with the distortion correction, so that the timing of the image display and the timing of the backlight control can be made closer to each other as compared with the case of FIG. 8. Accordingly, the timing adjustment is not necessary or simplified as compared with the case of FIG. 8. In the second configuration example described later, similarly to the first configuration example, the image analysis is also performed in parallel with the distortion correction, and the timing adjustment is also not necessary and simplified as compared with the case of FIG. 8.

In the present embodiment, the image data to be analyzed is the output image data IMB. The distortion correction circuit 110 converts the pixel coordinates GZB=(x, y) output from the coordinate counter 112 into the reference coordinates GZA=(u, v) on the input image data IMA, and performs the distortion correction by outputting the pixel data of the output image data IMB at the pixel coordinates (x, y) based on the pixel data of the input image data IMA at the reference coordinates (u, v). The image analysis circuit 120 determines which display area AR among the plurality of display areas AR the pixel coordinates (x, y) output by the coordinate counter 112 belong to, and determines, based on the pixel data of the output image data IMB at the pixel coordinates (x, y) output by the distortion correction circuit 110, whether the display area AR to which the pixel coordinates (x, y) are determined to belong is the display area AR that becomes transparent.

According to the present embodiment, the backlight control based on the image analysis is performed based on the pixel coordinates (x, y) output by the coordinate counter 112 used for the distortion correction and the pixel data of the output image data IMB output by the distortion correction circuit 110 corresponding to the pixel coordinates (x, y). Accordingly, the distortion correction and the backlight control based on the image analysis are performed in parallel, and thus it is possible to eliminate or simplify the time lag adjustment between the HUD display and the backlight control as described above.

3. Second Configuration Example

Figure 10:
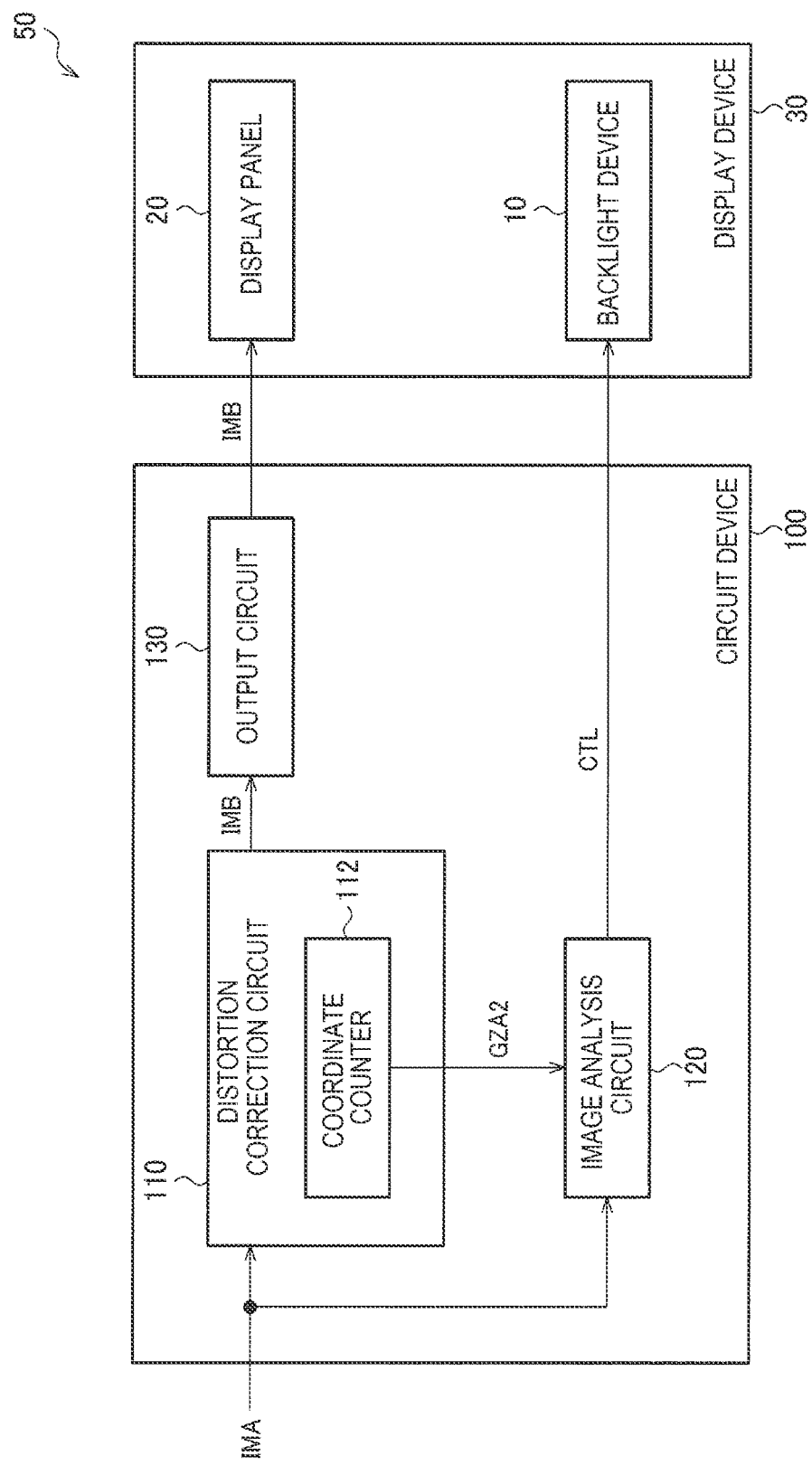
FIG. 10 is a second configuration example of a circuit device and a head-up display device.

FIG. 10 is the second configuration example of the circuit device 100 and the head-up display device 50. The components already described are denoted by the same reference numerals, and the description thereof will be omitted as appropriate.

In the second configuration example, the coordinate counter 112 counts pixel coordinates GZA2 in the input image data IMA. The image analysis circuit 120 performs image analysis in parallel with the distortion correction to output the control signal CTL for independently controlling the light emitting elements LS of the backlight device 10 to be turned on or turned off. Specifically, the image analysis circuit 120 outputs the control signal CTL based on the pixel coordinates GZA2 output by the coordinate counter 112 and pixel data of the pixel coordinates GZA2 in the input image data IMA.

The distortion correction circuit 110 corresponds to the reverse warp engine. The pixel data of the input image data IMA is sequentially input to the reverse warp engine, and the coordinate counter 112 counts the pixel coordinates of the sequentially input pixel data. The image analysis circuit 120 converts the pixel coordinates GZA2 into movement destination coordinates in the output image data IMB, and determines whether to turn off each light emitting element based on the movement destination coordinates and the pixel data of the pixel coordinates GZA2 in the input image data IMA.

Figure 11:
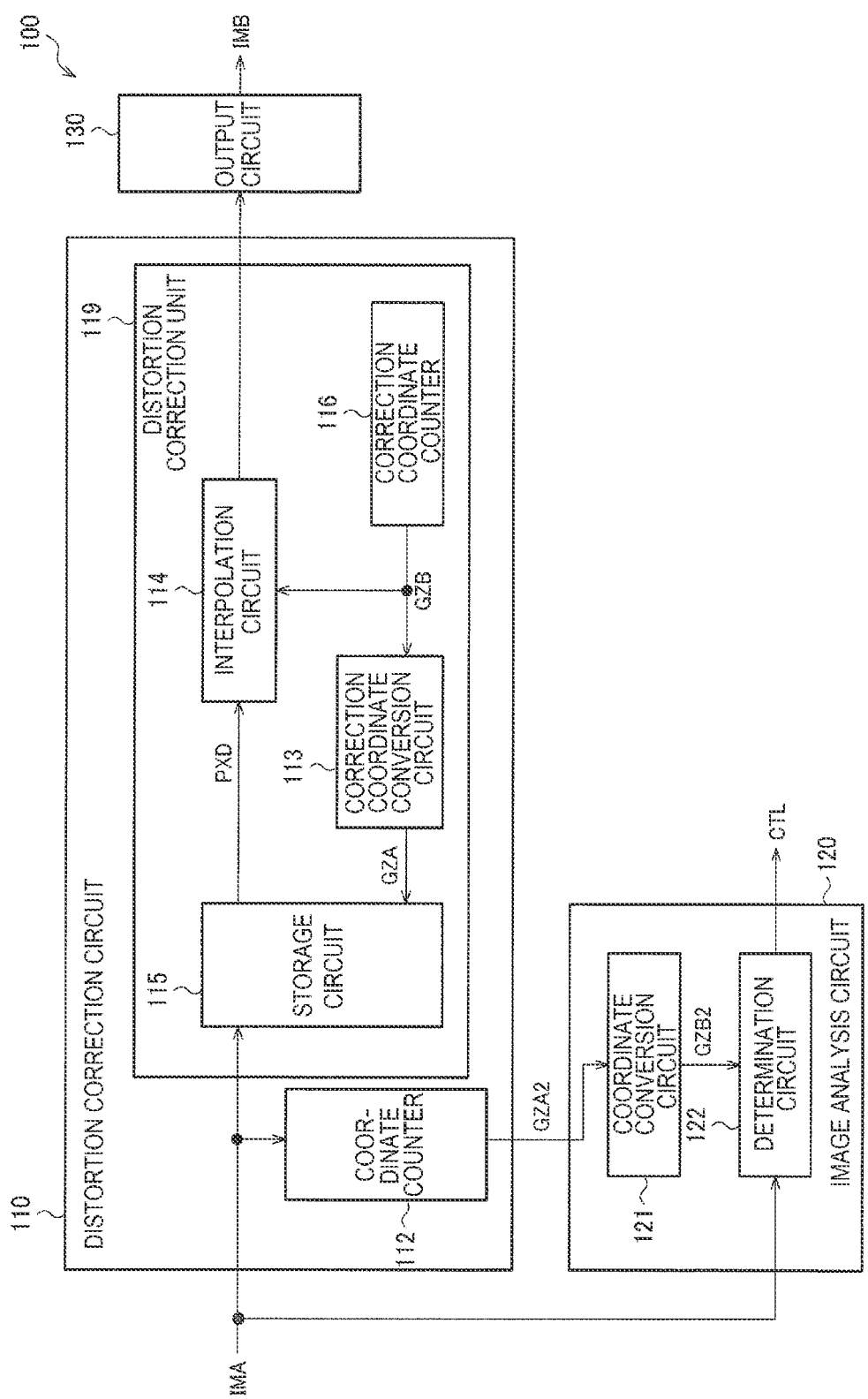
FIG. 11 is a second detailed configuration example of the circuit device.
Figure 12:
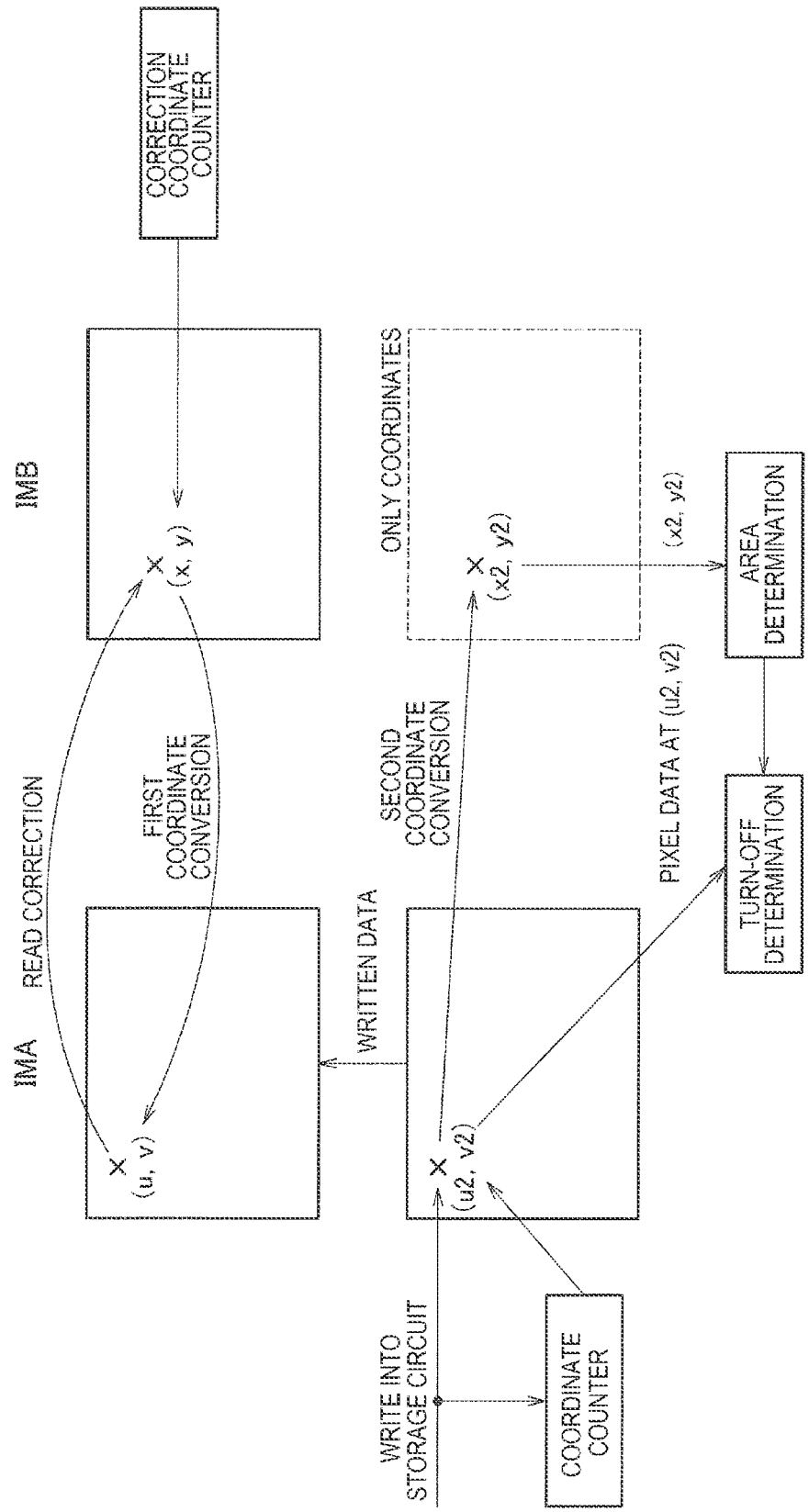
FIG. 12 is a diagram showing operations of the circuit device in the second detailed configuration example.

FIG. 11 is a second detailed configuration example of the circuit device 100. The distortion correction circuit 110 includes the coordinate counter 112 and a distortion correction unit 119. The distortion correction unit 119 includes the correction coordinate conversion circuit 113, the interpolation circuit 114, the storage circuit 115, and a correction coordinate counter 116. The image analysis circuit 120 includes a coordinate conversion circuit 121 and a determination circuit 122. FIG. 12 is a diagram showing operations of the circuit device 100 in the second detailed configuration example.

The storage circuit 115 temporarily stores the input image data IMA. The coordinate counter 112 counts the pixel coordinates GZA2=(u2, v2) of the pixel data written in the storage circuit 115.

The correction coordinate counter 116 outputs the pixel coordinates GZB=(x, y) on the output image data IMB. The correction coordinate conversion circuit 113 converts the pixel coordinates (x, y) into the reference coordinates GZA=(u, v) which are coordinates on the input image data IMA. This conversion is referred to as a first coordinate conversion. The storage circuit 115 outputs the pixel data PXD of the reference coordinates (u, v). Specifically, the correction coordinate conversion circuit 113 outputs read addresses of a plurality of pixels around the reference coordinates (u, v), and the storage circuit 115 reads pixel data of the plurality of pixels. The interpolation circuit 114 obtains the pixel data of the pixel coordinates (x, y) in the output image data IMB by performing interpolation processing on a plurality of pieces of pixel data that are read corresponding to the reference coordinates (u, v).

The coordinate conversion circuit 121 of the image analysis circuit 120 converts the pixel coordinates (u2, v2) output by the coordinate counter 112 into movement destination coordinates GZB2=(x2, y2) which are coordinates on the output image data IMB. This conversion is referred to as a second coordinate conversion. The second coordinate conversion is an inverse conversion of the first coordinate conversion. The determination circuit 122 determines that the movement destination coordinates (x2, y2) output by the coordinate conversion circuit 121 belong to which display area, that is a display area corresponding to which light emitting element. The determination circuit 122 determines whether to turn off each light emitting element by using a determination result and the pixel data of the pixel coordinates (u2, v2) in the input image data IMA.

The movement destination coordinates (x2, y2) indicate where in the output image data IMB the pixel data of the pixel coordinates (u2, v2) in the input image data IMA moves. The determination circuit 122 can determine whether the pixel data of the pixel coordinates (u2, v2) in the input image data IMA moves into the display area corresponding to any of the light emitting elements by performing area determination using the movement destination coordinates (x2, y2).

In the present embodiment described above, the image data to be analyzed is the input image data IMA. The image analysis circuit 120 includes the coordinate conversion circuit 121 and the determination circuit 122. The coordinate conversion circuit 121 converts the pixel coordinates GZA2=(u2, v2) output by the coordinate counter 112 into the movement destination coordinates GZB2=(x2, y2) on the output image data IMB. The determination circuit 122 determines which display area AR among the plurality of display areas AR the movement destination coordinates (x2, y2) belong to, and determines, based on the pixel data of the input image data IMA at the pixel coordinates (u2, v2), whether the display area AR to which the movement destination coordinates (x2, y2) are determined to belong is the display area AR that becomes transparent.

According to the present embodiment, the pixel coordinates GZA2=(u2, v2) of the input image data IMA input to the distortion correction circuit 110 are counted, and the pixel coordinates (u2, v2) are converted into the movement destination coordinates (x2, y2) on the output image data IMB. Then, based on the movement destination coordinates (x2, y2) and the pixel data of the pixel coordinates (u2, v2) in the input image data IMA, the backlight control based on the image analysis is performed. Accordingly, as described above with reference to FIGS. 8 and 9, the distortion correction and the backlight control based on the image analysis are performed in parallel, and thus it is possible to eliminate or simplify the time lag adjustment between the HUD display and the backlight control.

In the present embodiment, the distortion correction circuit 110 includes the correction coordinate counter 116 that counts the coordinates on the output image data IMB, and performs the distortion correction based on the first coordinate conversion that converts the coordinates output by the correction coordinate counter 116 into the reference coordinates GZA on the input image data IMA. The coordinate conversion circuit 121 obtains the movement destination coordinates GZB2=(x2, y2) by performing the second coordinate conversion, which is the inverse conversion of the first coordinate conversion, on the pixel coordinates GZA2=(u2, v2) output by the coordinate counter 112.

According to the present embodiment, the coordinate counter 112 that counts the pixel coordinates GZA2=(u2, v2) of the input image data IMA and the coordinate conversion circuit 121 that converts the pixel coordinates (u2, v2) into the movement destination coordinates GZB2=(x2, y2) on the output image data IMB are provided separately from the correction coordinate counter 116 used for the reverse warp. Accordingly, it is possible to determine whether the display area AR has a transparent color in the HUD display using the input image data IMA as the image data to be analyzed.

4. Third Configuration Example

Figure 13:
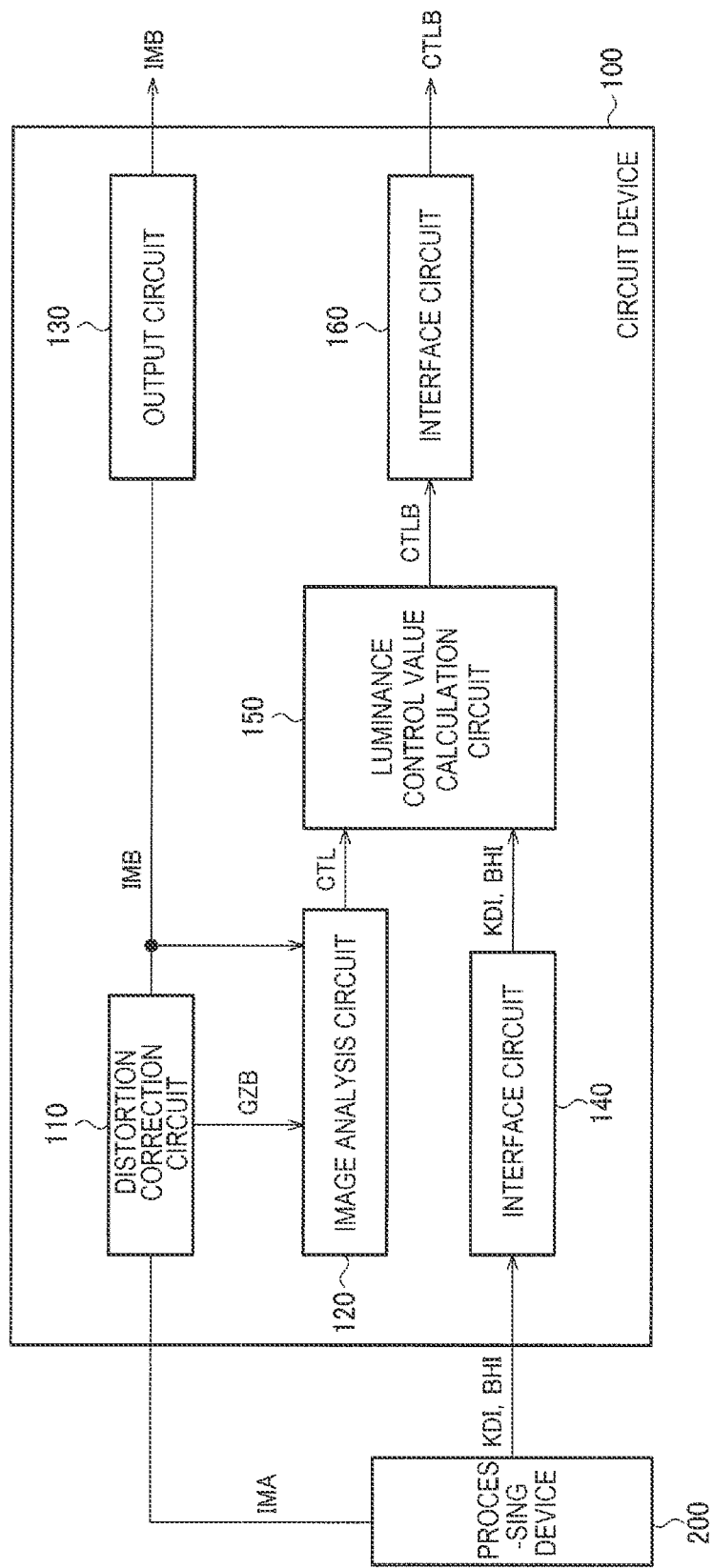
FIG. 13 is a third configuration example of a circuit device.

FIG. 13 is a third configuration example of the circuit device 100. The circuit device 100 includes the distortion correction circuit 110, the image analysis circuit 120, the output circuit 130, an interface circuit 140, a luminance control value calculation circuit 150, and an interface circuit 160. The components already described are denoted by the same reference numerals, and the description thereof will be omitted as appropriate. FIG. 13 shows an example in which the interface circuit 140, the luminance control value calculation circuit 150, and the interface circuit 160 are combined with the first configuration example, but the interface circuit 140, the luminance control value calculation circuit 150, and the interface circuit 160 may also be combined with the second configuration example.

Figure 14:
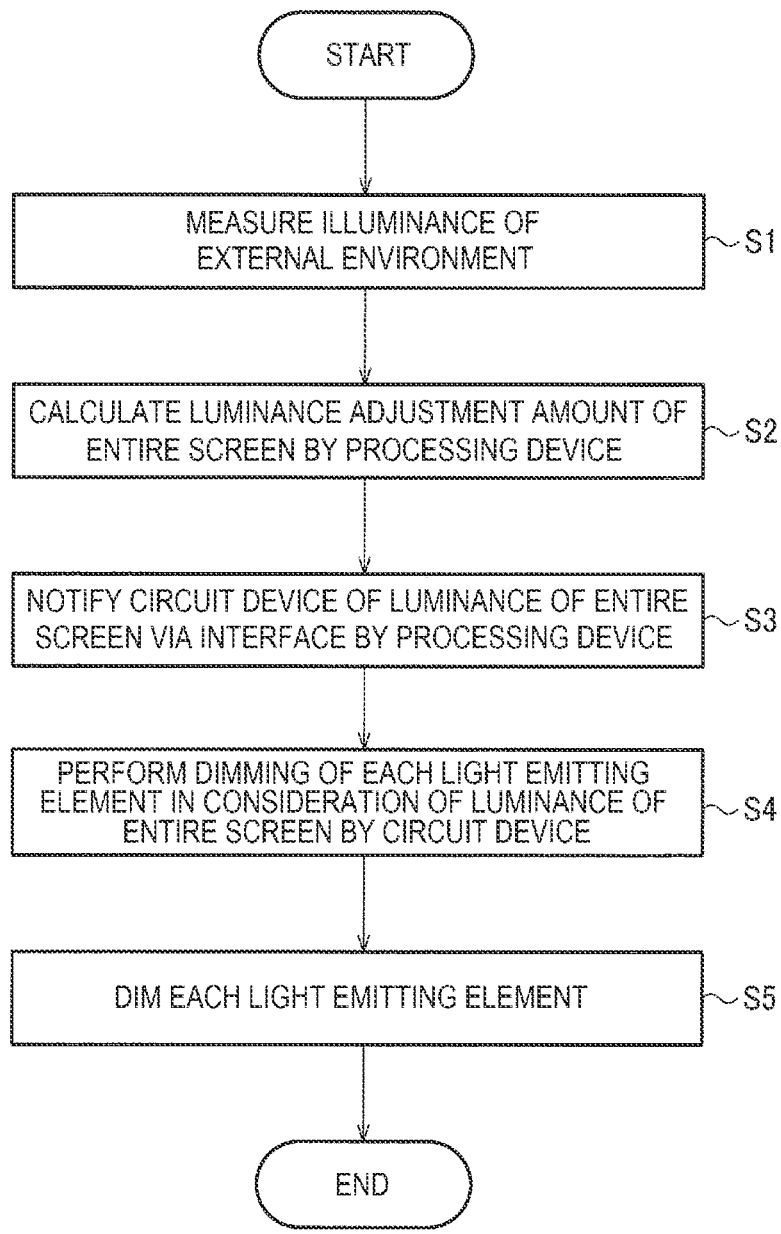
FIG. 14 is a flowchart showing a processing procedure of a HUD system including the circuit device in the third configuration example.

FIG. 14 is a flowchart showing a processing procedure of a HUD system including the circuit device 100 in the third configuration example.

In step S1, an illuminance sensor measures illuminance of an external environment. The illuminance of the external environment is illuminance of the real world visually recognized by the user together with the HUD display. In step S2, a processing device 200 calculates a luminance adjustment amount KDI of an entire screen based on a measurement value of the illuminance sensor. The processing device 200 is a so-called SoC, and is, for example, a processor such as a CPU or a microcomputer. SoC is an abbreviation for system on chip. CPU is an abbreviation for central processing unit.

In step S3, the processing device 200 transmits the luminance adjustment amount KDI to the interface circuit 140 of the circuit device 100. The interface circuit 140 is, for example, a serial interface based on an SPI standard, an I2C standard, or the like. SPI is an abbreviation for serial peripheral interface, and I2C is an abbreviation for inter-integrated circuit. In addition, the processing device 200 transmits a luminance variation correction amount BHI of each light emitting element to the interface circuit 140.

Figure 15:
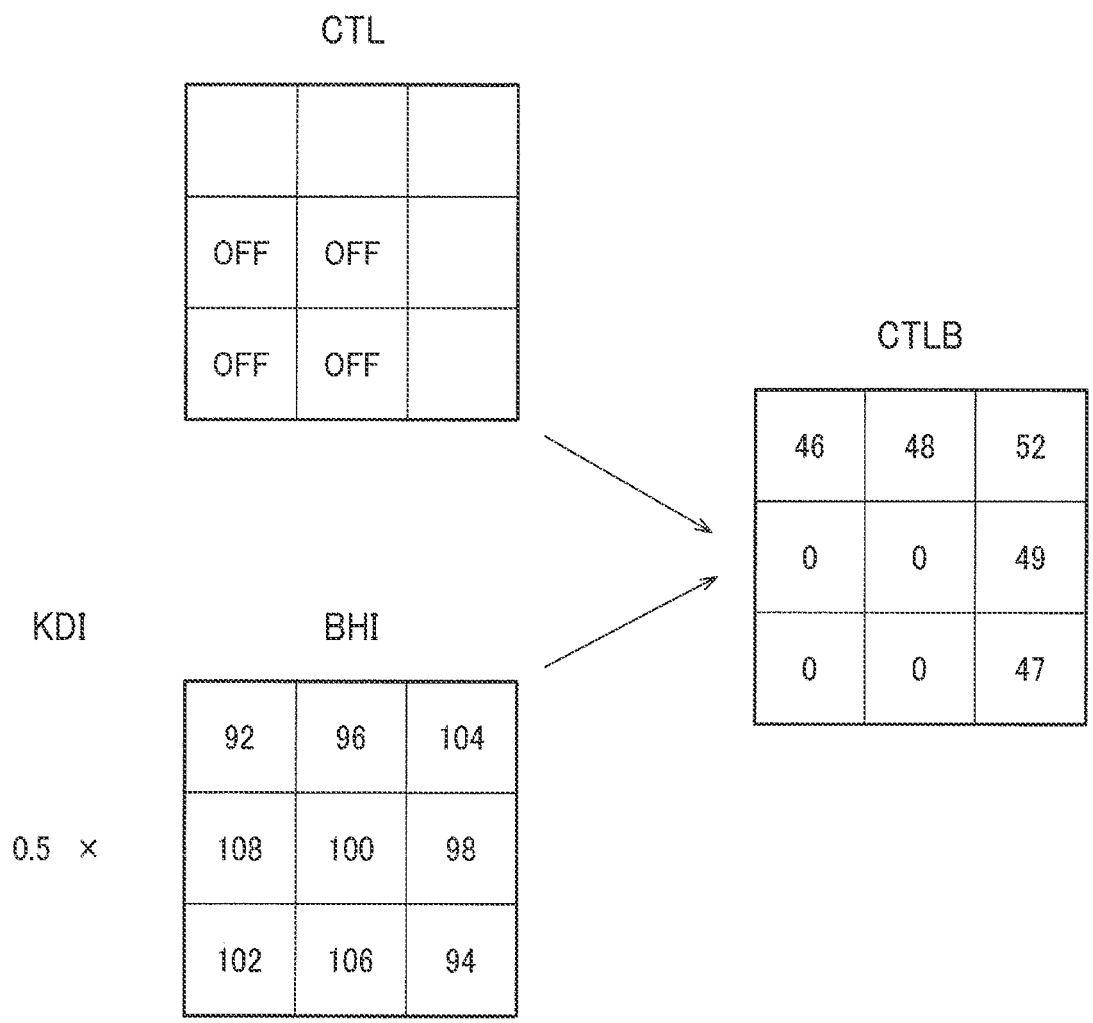
FIG. 15 is a diagram showing dimming of the light emitting elements.

In step S4, the luminance control value calculation circuit 150 of the circuit device 100 performs dimming of the light emitting elements in consideration of the luminance adjustment amount KDI of the entire screen. FIG. 15 is a diagram showing dimming of the light emitting elements. Here, it is assumed that the backlight device 10 has 3×3 light emitting elements.

One luminance adjustment amount KDI of the entire screen is set for all the light emitting elements, and KDI=0.5 in the example of FIG. 15. The luminance variation correction amount BHI sets a correction amount for each light emitting element. The distortion correction circuit 110 performs the distortion correction on the input image data IMA received from the processing device 200, and the image analysis circuit 120 performs the image analysis in parallel with the distortion correction to output the control signal CTL for controlling each light emitting element to be turned on or turned off. FIG. 15 only shows OFF, and blanks indicate ON. The luminance control value calculation circuit 150 multiplies the luminance adjustment amount KDI of the entire screen by the luminance variation correction amount BHI to obtain luminance control values of the light emitting elements. Among the luminance control values, the luminance control value calculation circuit 150 sets the luminance control value of the light emitting element, which is instructed to be turned off by the control signal CTL, to zero, and outputs the luminance control value as a control signal CTLB.

In step S5, the interface circuit 160 outputs the control signal CTLB to the backlight device 10, and the backlight device 10 dims the light emitting elements based on the control signal CTLB. Light emitting elements having a luminance control value of zero are turned off, and light emitting elements having a luminance control value larger than zero emit light at brightness controlled by the luminance control value. Since luminance variation is corrected by the luminance variation correction amount BHI, the turn-on light emitting elements emit light at the same brightness as each other.

In the present embodiment described above, the circuit device 100 includes the luminance control value calculation circuit 150 and the interface circuit 160. The luminance control value calculation circuit 150 calculates the luminance control value for each light emitting element LS of the plurality of light emitting elements by changing a backlight control signal received from the external processing device 200 based on a result of the backlight control processing by the image analysis circuit 120. The interface circuit 160 outputs the luminance control value for each light emitting element LS to the backlight device 10. In the third configuration example, the backlight control signal is the luminance adjustment amount KDI and the luminance variation correction amount BHI of the entire screen, the result of the backlight control processing is the control signal CTL, and the luminance control value for each light emitting element LS is output to the backlight device 10 as the control signal CTLB.

According to the present embodiment, the backlight control by the image analysis circuit 120 can be synthesized with dimming control by the external processing device 200. Specifically, the dimming control by the external processing device 200 is reflected in the light emitting element determined to be turned on by the image analysis circuit 120 through the image analysis. In addition, the light emitting element determined to be turned off by the image analysis circuit 120 through the image analysis is controlled to be turned off regardless of the dimming control by the external processing device 200. Although control and input of the backlight device 10 are normally performed in one system, according to the present embodiment, the dimming control by the processing device 200 and the backlight control by the image analysis circuit 120 can be synthesized and input with respect to the control and input in the one system.

The circuit device according to the present embodiment described above is used in a head-up display device. The head-up display device includes a display panel and a backlight device having a plurality of light emitting elements. The circuit device includes a distortion correction circuit and an image analysis circuit. The distortion correction circuit performs distortion correction on input image data and outputs output image data after the distortion correction. The image analysis circuit analyzes image data to be analyzed, which is the input image data or the output image data, and, based on an analysis result, performs backlight control processing of turning off a light emitting element corresponding to a display area that becomes transparent when projected by the head-up display device among a plurality of display areas corresponding to the plurality of light emitting elements in the display panel.

According to the present embodiment, the display area that becomes transparent when projected by the head-up display device is determined by image analysis. Among the plurality of light emitting elements disposed in the backlight device, the light emitting element corresponding to the display area that becomes transparent when projected by the head-up display device is turned off, so that the display area becomes an area that is originally transparent rather than being displayed whitish in a HUD display. Accordingly, even when a background is dark at night or in a tunnel or the like, the area without display objects in the HUD display becomes the area that is originally transparent, and visibility of the background does not decrease.

Further, in the present embodiment, the image analysis circuit may analyze whether the image data to be analyzed in each display area of the plurality of display areas is transparent color data, and may perform the backlight control processing of turning off the light emitting element corresponding to the display area in which the image data to be analyzed is analyzed as transparent color data.

According to the present embodiment, the image analysis circuit performs the image analysis of analyzing whether the image data to be analyzed in each display area is the transparent color data, and thus it is possible to determine the display area that becomes transparent when projected by the head-up display device among the plurality of display areas.

In the present embodiment, the distortion correction circuit may include a coordinate counter that counts pixel coordinates of the image data to be analyzed. The image analysis circuit may determine the display area to which each pixel of the image data to be analyzed belongs among the plurality of display areas based on the pixel coordinates output by the coordinate counter, and may determine the display area that becomes transparent based on a determination result.

According to the present embodiment, since the pixel coordinates output by the coordinate counter indicate pixel coordinates of each pixel in the image data to be analyzed, the image analysis circuit can determine the display area to which each pixel of the image data to be analyzed belongs among the plurality of display areas based on the pixel coordinates.

In addition, in the present embodiment, the image analysis circuit determines whether the pixel data belonging to each display area of the plurality of display areas is transparent color data based on the pixel coordinates output by the coordinate counter and the pixel data of the image data to be analyzed at the pixel coordinates, thereby determining whether each display area is the display area that becomes transparent.

According to the present embodiment, the image analysis circuit can determine the display area to which the pixel coordinates belong and whether the pixel data of the pixel coordinates are transparent color data. Accordingly, the image analysis circuit can determine whether each display area is the display area that becomes transparent when projected by the head-up display device. According to the present embodiment, the image data to be analyzed is the input image data input to the distortion correction circuit or the output image data output by the distortion correction circuit, and the pixel coordinates output by the coordinate counter included in the distortion correction circuit are used for the image analysis. Accordingly, the distortion correction circuit performs the distortion correction, and the image analysis circuit can perform backlight control based on the image analysis in parallel with the distortion correction, and thus it is possible to eliminate or simplify a time lag adjustment between the HUD display and the backlight control.

In the present embodiment, the image data to be analyzed may be the output image data. The distortion correction circuit may convert the pixel coordinates output by the coordinate counter into reference coordinates on the input image data, and may perform the distortion correction by outputting the pixel data of the output image data at the pixel coordinates based on the pixel data of the input image data at the reference coordinates. The image analysis circuit may determine which display area among the plurality of display areas the pixel coordinates output by the coordinate counter belong to, and may determine, based on the pixel data of the output image data at pixel coordinates output by the distortion correction circuit, whether the display area to which the pixel coordinates are determined to belong is the display area that becomes transparent.

According to the present embodiment, the backlight control based on the image analysis is performed based on the pixel coordinates output by the coordinate counter used for the distortion correction and the pixel data of the output image data output by the distortion correction circuit and corresponding to the pixel coordinates. Accordingly, the distortion correction and the backlight control based on the image analysis are performed in parallel, and thus it is possible to eliminate or simplify the time lag adjustment between the HUD display and the backlight control.

In the present embodiment, the image data to be analyzed may be the input image data. The image analysis circuit may include a coordinate conversion circuit and a determination circuit. The coordinate conversion circuit may convert the pixel coordinates output by the coordinate counter into movement destination coordinates on the output image data. The determination circuit may determine which display area among the plurality of display areas the movement destination coordinates belong to, and may determine, based on the pixel data of the input image data at the pixel coordinates, whether the display area to which the movement destination coordinates are determined to belong is the display area that becomes transparent.

According to the present embodiment, pixel coordinates of the input image data input to the distortion correction circuit are counted, and the pixel coordinates are converted into the movement destination coordinates on the output image data. Then, based on the movement destination coordinates and the pixel data of the pixel coordinates in the input image data, the backlight control based on the image analysis is performed. Accordingly, the distortion correction and the backlight control based on the image analysis are performed in parallel, and thus it is possible to eliminate or simplify the time lag adjustment between the HUD display and the backlight control.

In the present embodiment, the distortion correction circuit may include a correction coordinate counter that counts coordinates on the output image data, and may perform the distortion correction based on a first coordinate conversion that converts coordinates output by the correction coordinate counter into the reference coordinates on the input image data. The coordinate conversion circuit may obtain the movement destination coordinates by performing a second coordinate conversion, which is an inverse conversion of the first coordinate conversion, on the pixel coordinates output by the coordinate counter.

According to the present embodiment, the coordinate counter that counts the pixel coordinates of the input image data and the coordinate conversion circuit that converts the pixel coordinates into the movement destination coordinates on the output image data are provided separately from the correction coordinate counter used for reverse warp. Accordingly, it is possible to determine whether the display area has a transparent color when projected by the head-up display device using the input image data as the image data to be analyzed.

In the present embodiment, the circuit device may include a luminance control value calculation circuit and an interface circuit. The luminance control value calculation circuit may calculate a luminance control value for each light emitting element of the plurality of light emitting elements by changing a backlight control signal received from an external processing device based on a result of the backlight control processing by the image analysis circuit. The interface circuit may output the luminance control value for each light emitting element to the backlight device.

According to the present embodiment, the backlight control by the image analysis circuit can be synthesized with dimming control by the external processing device. Specifically, the dimming control by the external processing device is reflected in the light emitting element determined to be turned on by the image analysis circuit through the image analysis. In addition, the light emitting element determined to be turned off by the image analysis circuit through the image analysis is controlled to be turned off regardless of the dimming control by the external processing device. Although control and input of the backlight device are normally performed in one system, according to the present embodiment, the dimming control by the processing device and the backlight control by the image analysis circuit can be synthesized and input with respect to the control and input in the one system.

The head-up display device according to the present embodiment includes any one of the circuit device, the display panel, and the backlight device as described above.

Although the present embodiment has been described in detail above, it will be easily understood by those skilled in the art that many modifications can be made without substantially departing from the novel matters and effects of the present disclosure. Therefore, all such modifications are intended to be included within the scope of the present disclosure. For example, a term cited with a different term having a broader meaning or the same meaning at least once in the description or the drawings can be replaced by the different term in any place in the description and the drawings. All combinations of the present embodiment and the modifications are also included in the scope of the present disclosure. Configurations, operations, or the like of the circuit device, the display device, the backlight device, or the like are not limited to those described in the present embodiment, and various modifications can be made.

What is claimed is:

1. A circuit device, which is used in a head-up display device including a display panel and a backlight device having a plurality of light emitting elements, the circuit device comprising:
    a distortion correction circuit configured to perform distortion correction on input image data and output output image data after the distortion correction; and
    an image analysis circuit configured to analyze image data to be analyzed, which is the input image data or the output image data, and, based on an analysis result, and perform backlight control processing of turning off a light emitting element corresponding to a display area that becomes transparent when projected by the head-up display device among a plurality of display areas corresponding to the plurality of light emitting elements in the display panel,
    wherein the distortion correction circuit includes a coordinate counter configured to count pixel coordinates of the image data to be analyzed,
    the image analysis circuit is configured to determine the display area to which each pixel of the image data to be analyzed belongs among the plurality of display areas based on pixel coordinates output by the coordinate counter, and determine the display area that becomes transparent based on a determination result, and
    the image analysis circuit is configured to determine whether pixel data belonging to each display area of the plurality of display areas is transparent color data based on the pixel coordinates output by the coordinate counter and pixel data of the image data to be analyzed at the pixel coordinates, thereby determining whether each display area is the display area that becomes transparent.

2. The circuit device according to claim 1, wherein
    the image analysis circuit is configured to analyze whether the image data to be analyzed in each display area of the plurality of display areas is transparent color data, and perform the backlight control processing of turning off the light emitting element corresponding to the display area in which the image data to be analyzed is analyzed as transparent color data.

3. A circuit device, which is used in a head-up display device including a display panel and a backlight device having a plurality of light emitting elements, the circuit device comprising:
    a distortion correction circuit configured to perform distortion correction on input image data and output output image data after the distortion correction; and
    an image analysis circuit configured to analyze image data to be analyzed, which is the input image data or the output image data, and, based on an analysis result, and perform backlight control processing of turning off a light emitting element corresponding to a display area that becomes transparent when projected by the head-up display device among a plurality of display areas corresponding to the plurality of light emitting elements in the display panel,
    wherein the distortion correction circuit includes a coordinate counter configured to count pixel coordinates of the image data to be analyzed,
    the image analysis circuit is configured to determine the display area to which each pixel of the image data to be analyzed belongs among the plurality of display areas based on pixel coordinates output by the coordinate counter, and determine the display area that becomes transparent based on a determination result, the image data to be analyzed is the output image data, the distortion correction circuit is configured to convert the pixel coordinates output by the coordinate counter into reference coordinates on the input image data, and perform the distortion correction by outputting pixel data of the output image data at the pixel coordinates based on pixel data of the input image data at the reference coordinates, and the image analysis circuit is configured to determine which display area among the plurality of display areas the pixel coordinates output by the coordinate counter belong to, and determine, based on the pixel data of the output image data at the pixel coordinates output by the distortion correction circuit, whether the display area to which the pixel coordinates are determined to belong is the display area that becomes transparent.

4. A circuit device, which is used in a head-up display device including a display panel and a backlight device having a plurality of light emitting elements, the circuit device comprising:

a distortion correction circuit configured to perform distortion correction on input image data and output output image data after the distortion correction; and an image analysis circuit configured to analyze image data to be analyzed, which is the input image data or the output image data, and, based on an analysis result, perform backlight control processing of turning off a light emitting element corresponding to a display area that becomes transparent when projected by the head-up display device among a plurality of display areas corresponding to the plurality of light emitting elements in the display panel, wherein the distortion correction circuit includes a coordinate counter configured to count pixel coordinates of the image data to be analyzed, the image analysis circuit is configured to determine the display area to which each pixel of the image data to be analyzed belongs among the plurality of display areas based on pixel coordinates output by the coordinate counter, and determine the display area that becomes transparent based on a determination result, the image data to be analyzed is the input image data, and the image analysis circuit includes:

a coordinate conversion circuit configured to convert the pixel coordinates output by the coordinate counter into movement destination coordinates on the output image data; and a determination circuit configured to determine which display area among the plurality of display areas the movement destination coordinates belong to, and determine, based on the pixel data of the input image data at the pixel coordinates, whether the display area to which the movement destination coordinates are determined to belong is the display area that becomes transparent.

5. The circuit device according to claim 4, wherein the distortion correction circuit includes a correction coordinate counter configured to count coordinates on the output image data, and is configured to perform the distortion correction based on a first coordinate conversion that converts coordinates output by the correction coordinate counter into reference coordinates on the input image data, and the coordinate conversion circuit is configured to obtain the movement destination coordinates by performing a second coordinate conversion, which is an inverse conversion of the first coordinate conversion, on the pixel coordinates output by the coordinate counter.

6. The circuit device according to claim 1, further comprising:

a luminance control value calculation circuit configured to calculate a luminance control value for each light emitting element of the plurality of light emitting elements by changing a backlight control signal received from an external processing device based on a result of the backlight control processing from the image analysis circuit; and an interface circuit configured to output the luminance control value for each light emitting element to the backlight device.

7. A head-up display device comprising:
the circuit device according to claim 1;
the display panel; and
the backlight device.

* * * * *